United States Patent
Flandin

(10) Patent No.: US 8,245,382 B2
(45) Date of Patent: Aug. 21, 2012

(54) METHOD OF MOUNTING ON A MOTOR VEHICLE AN UNDERBODY STRUCTURAL ELEMENT AND A TECHNICAL FRONT END THE METHOD INCLUDING PIVOTING THE TECHNICAL FRONT END USING A CONNECTING MECHANISM THAT CONNECTS THE TECHNICAL FRONT END TO THE UNDER BODY ELEMENT

(75) Inventor: Michael Flandin, Broue (FR)

(73) Assignee: Renault S.A.S., Boulogne Billancourt (FR)

( * ) Notice: Subject to any disclaimer, the term of this patent is extended or adjusted under 35 U.S.C. 154(b) by 130 days.

(21) Appl. No.: 12/594,437

(22) PCT Filed: Mar. 21, 2008

(86) PCT No.: PCT/FR2008/050496
§ 371 (c)(1),
(2), (4) Date: Mar. 2, 2010

(87) PCT Pub. No.: WO2008/139071
PCT Pub. Date: Nov. 20, 2008

(65) Prior Publication Data
US 2010/0164250 A1    Jul. 1, 2010

(30) Foreign Application Priority Data
Apr. 3, 2007   (FR) .................... 07 54227

(51) Int. Cl.
*B62D 65/16*   (2006.01)
*B62D 65/02*   (2006.01)

(52) U.S. Cl. .......... 29/464; 29/409; 29/407.1; 29/897.2
(58) Field of Classification Search .............. 29/897.2, 29/407.09, 407.1, 464, 559; *B62D 65/02, B62D 65/16, 65/08, 65/10, 65/04*
See application file for complete search history.

(56) References Cited

U.S. PATENT DOCUMENTS

| | | | |
|---|---|---|---|
| 3,123,170 A | 3/1964 | Bryant | |
| 4,796,346 A * | 1/1989 | Kawasaki et al. | 29/700 |
| 5,123,695 A * | 6/1992 | Kanemitsu et al. | 296/193.09 |
| 6,173,947 B1 * | 1/2001 | Johnson | 269/17 |
| 6,729,008 B2 * | 5/2004 | Nishijima | 29/458 |
| 6,729,681 B2 * | 5/2004 | Yustick | 296/193.01 |
| 6,769,171 B2 * | 8/2004 | Jung | 29/700 |
| 7,032,283 B2 * | 4/2006 | Tashiro et al. | 29/428 |
| 2002/0053806 A1 * | 5/2002 | Lanard et al. | 293/118 |

(Continued)

FOREIGN PATENT DOCUMENTS

DE   102007017167 A1 * 12/2008

(Continued)

*Primary Examiner* — David Bryant
*Assistant Examiner* — Jason L Vaughan
(74) *Attorney, Agent, or Firm* — Oblon, Spivak, McClelland, Maier & Neustadt, L.L.P.

(57) ABSTRACT

A method for mounting on a motor vehicle at least one transverse understructure member and a technical front panel to be mounted at a longitudinal end of a frame structural member including two transversely opposite rails and two transversely opposite portions of the frame structural member, in particular hinging members for holding the vehicle headlights. The method includes placing the technical front panel in a vertical position on the transversely opposite portions of the frame structural member, and transversely positioning the technical front panel on the portions.

2 Claims, 3 Drawing Sheets

U.S. PATENT DOCUMENTS

Figure 5:
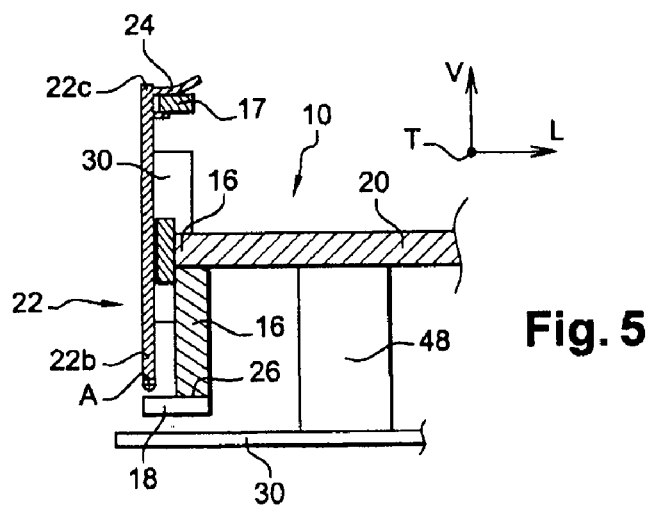

| | | |
|---|---|---|
| 2005/0062315 A1 | 3/2005 | Andritter et al. |
| 2009/0302643 A1 | 12/2009 | Bogaert et al. |

FOREIGN PATENT DOCUMENTS

| | | | |
|---|---|---|---|
| EP | 171576 A1 | * | 2/1986 |
| FR | 2 870 197 | | 11/2005 |
| FR | 2870197 A1 | * | 11/2005 |
| JP | 05285752 A | * | 11/1993 |
| JP | 2003 237628 | | 8/2003 |
| JP | 2003 327162 | | 11/2003 |
| JP | 2005224894 A | * | 8/2005 |
| JP | 2006044601 A | * | 2/2006 |
| JP | 2007038770 A | * | 2/2007 |

* cited by examiner

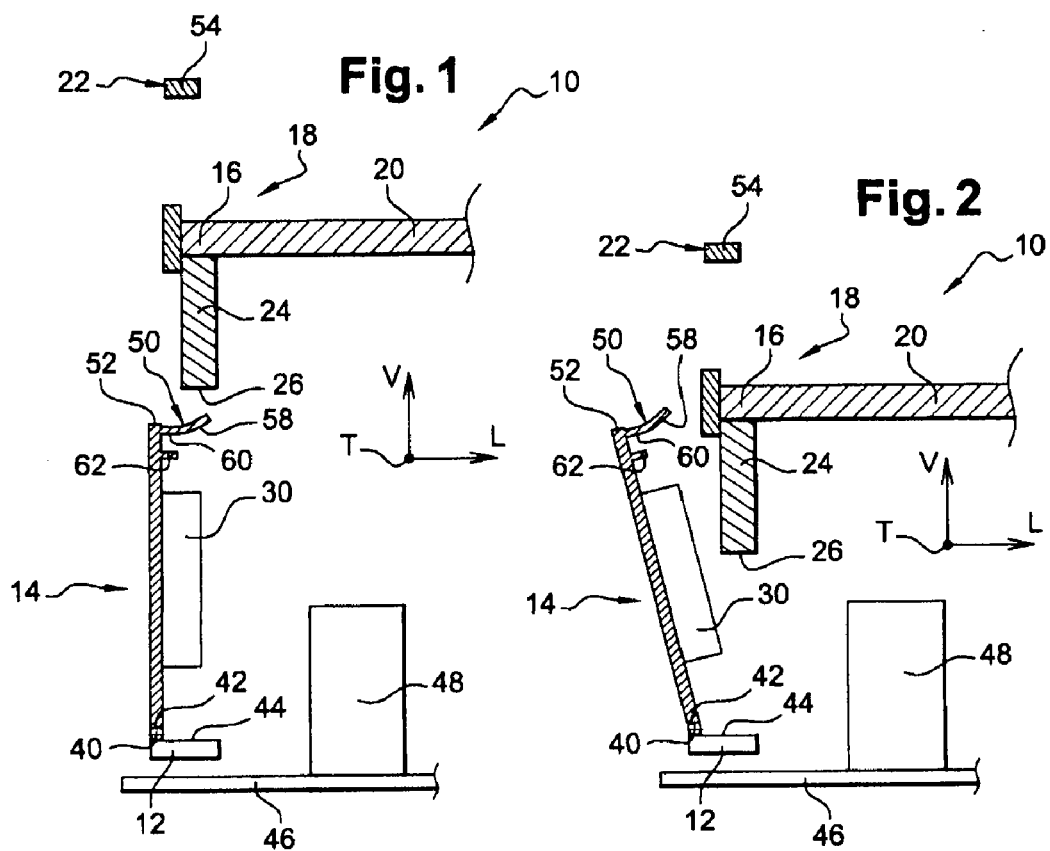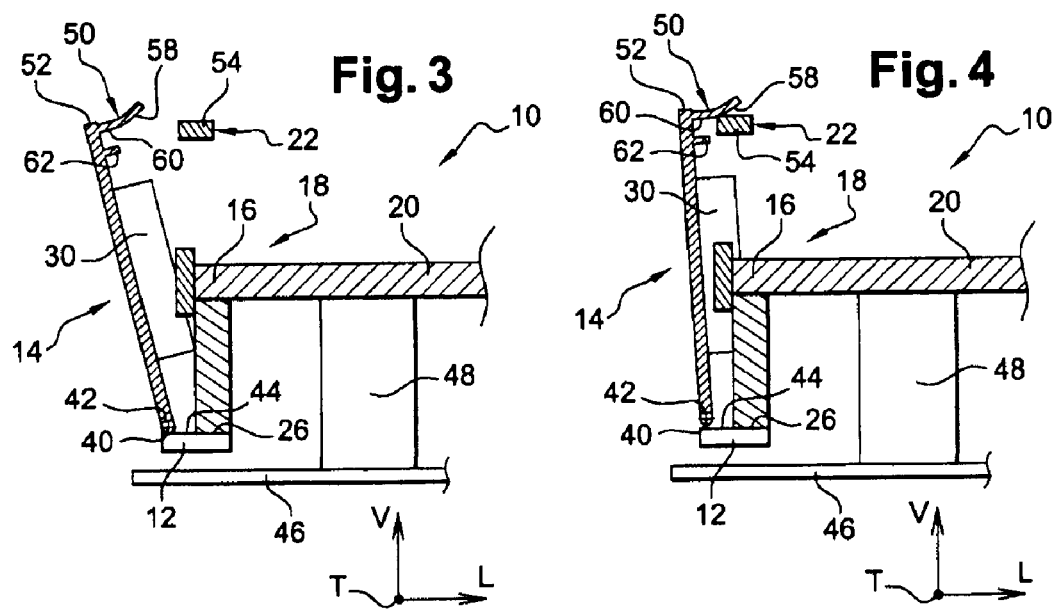

METHOD OF MOUNTING ON A MOTOR VEHICLE AN UNDERBODY STRUCTURAL ELEMENT AND A TECHNICAL FRONT END THE METHOD INCLUDING PIVOTING THE TECHNICAL FRONT END USING A CONNECTING MECHANISM THAT CONNECTS THE TECHNICAL FRONT END TO THE UNDER BODY ELEMENT

The invention relates to a method for mounting, on a motor vehicle, at least one transverse underbody structure element and a technical front panel which is intended to be mounted at a longitudinal end of a body shell structure element of the vehicle.

The invention relates more specifically to a method for mounting, on a motor vehicle, at least one transverse underbody structure element and a technical front panel which is intended to be mounted at a longitudinal end of a body shell structure element comprising two transversely opposed rails and two transversely opposed parts of the body shell structure element.

Numerous examples of mounting methods of this type are known.

It is known practice using such a method to mount a vehicle underbody structure element upward in a vertical direction.

For example, it is known practice to mount a cross member upward in the vertical direction under elements or teardrop mounts which hang down vertically from the rails of the vehicle.

It is possible at the same time to mount a technical front panel that rests on the underbody structure element of the vehicle.

Hence, document FR-A-2 838 094 discloses how to mount vertically upward the assembly that consists of the cross member and of the technical front panel resting on said cross member.

In some cases, the transverse size of the technical front panel makes it impossible to mount directly in the vertical direction. This is the case, for example, when the transverse size of the technical front panel exceeds the transverse size of teardrop mounts.

In such circumstances, it is known practice for the technical front panel to be positioned on the cross member that forms the underbody structure element, to then tilt it forward slightly and then attach the cross member under the teardrop mounts, the technical front panel then slipping in front of the teardrop mounts, before finally angling the technical front face back against the longitudinal end of the body shell structure element before attaching it thereto.

In such circumstances, the final position of the technical front panel is determined by its prior positioning on the underbody structure element.

Now, in most present-day vehicles, the technical front panel also carries a fair number of points of attachment for vehicle bodywork elements, particularly attachment points for a vehicle front bumper or fender.

The final positioning of these attachment points is of key importance to the final aesthetic look of the vehicle. Specifically, the bumper or fender has to be fitted very accurately with respect to the vehicle body shell structure element which is intended to carry bodywork elements such as the hood, the wings or the headlamps, with which the bumper or fender has to be a perfect fit.

Now, the positional clearances for the underbody structure element are very imprecise, because the teardrop mounts to which this element is attached have themselves been fitted with excessive clearances with respect to the body shell structure element of the vehicle, and also using a different frame of reference.

It would therefore be desirable to be able to position the technical front panel directly with respect to the body shell structure element of the vehicle in order to guarantee minimal positioning tolerances, while at the same time keeping to the mounting method described hereinabove, performed upward in a vertical direction, which is particularly well suited to mass assembly on a production line.

To this end, the invention proposes a method of the aforementioned type, comprising at least two steps of positioning the technical front panel with respect to the body shell structure element, particularly a step of vertically positioning the technical front panel, and a step of positioning the technical front panel transversely.

To this end, the invention proposes a method of the aforementioned type, characterized in that it comprises at least:
- a first step during which the technical front panel is positioned on a transverse underbody structure element via a connecting means that allows said technical front panel to pivot about an axis that is transverse and allows said technical front panel a vertical translational movement,
- a second step during which the technical front panel is pivoted forward about the connecting means of transverse axis,
- a third step during which the underbody structure element and the technical front panel in the tilted position are moved upward as far as the vehicle,
- a fourth step during which the technical front panel is pivoted in such a way that at least a first means carried by an upper edge of the technical front panel encounters a complementary second means carried by at least one of the transversely opposed parts of the body shell structure element,
- a fifth step during which the technical front panel is pushed rearward on the motor vehicle so that the first means rides up onto the second means, the technical front panel lifting up from the transverse underbody structure element.

The method additionally comprises a sixth step during which a longitudinal finger carried by one of the sides of the top edge of the technical front panel is realigned with a complementary third means carried by one of the opposed parts of the body shell structure element in order transversely to re-center the technical front panel.

The invention also relates to a vehicle for implementing the method described hereinabove.

According to other features of the invention:
- the technical front panel comprises a central part carrying, in particular, vehicle cooling elements, opposed lateral parts fixed to the opposite vertical edges of the central part, and a top cross member comprising the top edge,
- the top edge of the cross member of the technical front panel comprises, at each of its ends, the first means including a guide element or "throat" comprising at least one surface that is inclined upward from rear to front and is intended to ride up along an associated corresponding flat surface that forms the second means carried by each of the opposed parts of the body shell structure element,
- the first means of the top edge of the cross member of the technical front panel comprises, forward of the guide element, a flat surface intended to rest on the associated corresponding flat surface carried by each of the parts of the body shell structure element,
- one of the parts of the body shell structure element comprises a reference element intended to collaborate with the finger carried by the side of the top edge of the cross member of the technical front panel, particularly a drilling intended to accept the finger or a flat surface intended to have the finger butt transversely against it.

Figure 6:
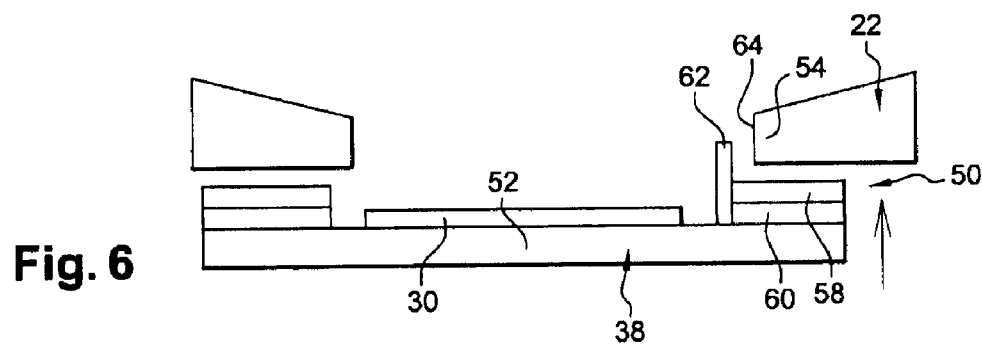
Figure 7:
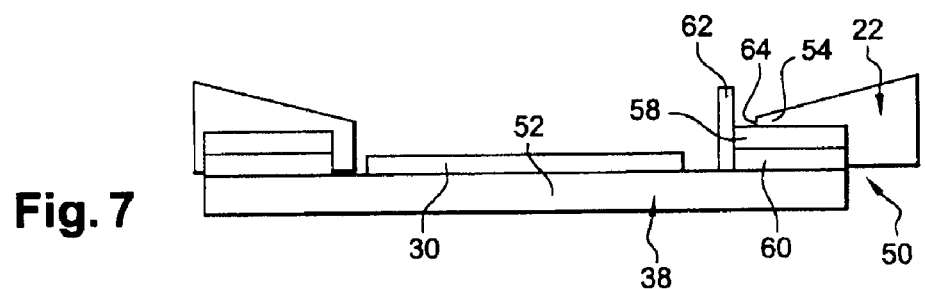
Figure 8:
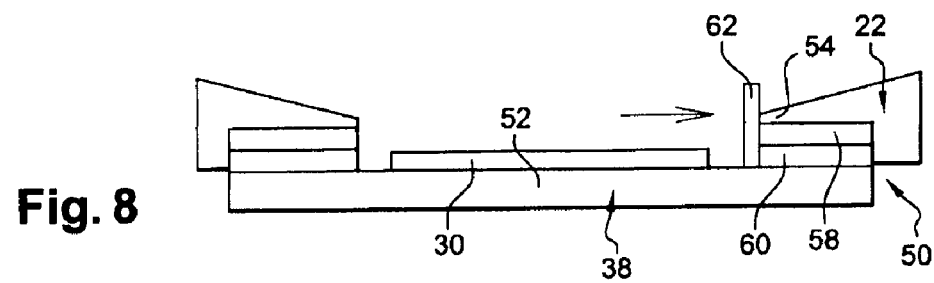
Figure 9:
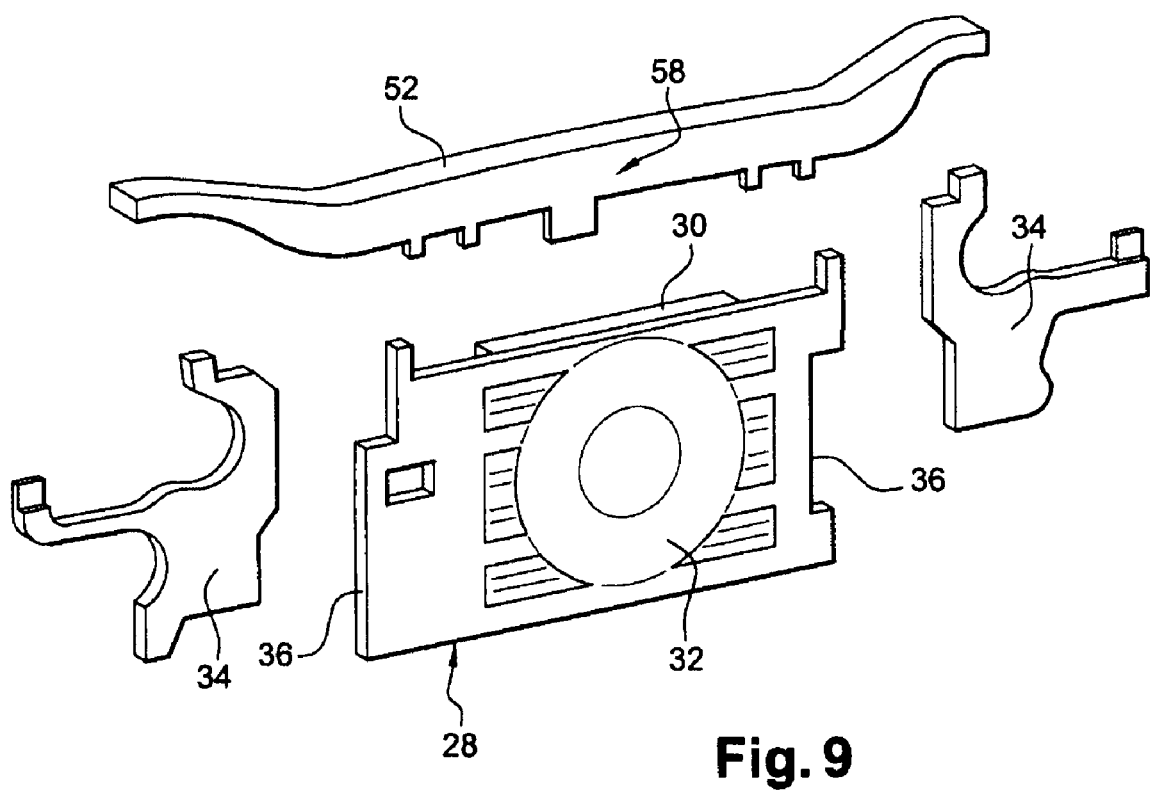

Other features and advantages of the invention will become apparent from reading the detailed description which follows, for an understanding of which reference will be made to the attached drawings in which:

FIGS. 1 to 5 are schematic views in longitudinal section illustrating the first 5 steps in the method according to the invention, FIGS. 6 to 8 are schematic views from above illustrating the fourth and sixth steps in the method according to the invention, FIG. 9 is an exploded perspective view of the technical front panel.

In the description which will follow, identical reference numerals denote components that are identical or perform similar functions.

FIGS. 1 to 8 depict the various steps in a method according to the invention. The method will be described with reference to the directions of the trihedral frame of reference "T", "L", "V", where "T" denotes the transverse direction, "L" denotes the longitudinal direction, and "V" denotes the vertical direction.

In the known way, a method such as this is intended to allow at least one transverse underbody structure element 12, for example a lower cross member, and a technical front panel 14 intended to be mounted at one longitudinal end 16 of a body shell structure element 18 to be mounted on a motor vehicle 10.

In the known way, the body shell structure element 18 comprises at least two transversely opposed rails 20 and two transversely opposed parts 22 of the body shell structure element 18, particularly sets of fittings intended to support headlamps (not depicted of the vehicle). Each rail 20 carries teardrop mounts 24 which hang down vertically from each rail, and the lower ends 26 of which are intended to carry the underbody structure element 12, once attached.

As illustrated by FIGS. 1 to 8 and more specifically by FIG. 9, the technical front panel 14 comprises a central part 28 bearing, in particular, vehicle cooling elements, such as, for example, a radiator 30 and an electric cooling fan unit 32, to which opposed lateral parts 34 fixed to the opposed vertical edges 36 of the central part 28, and a top cross member 38, are connected.

According to the invention, the method according to the invention comprises a first step represented in FIG. 1, during which the technical front panel is positioned on a transverse underbody structure element 12 via a connecting means 40 that allows said technical front panel to pivot about a transversely directed axis "T" and thus allowing, as will be seen later on in the present description, said technical front panel 14 a vertical translational movement.

The connecting means 40 may, for example, very simply consist of at least one tab carried by a lower edge 42 of the technical front panel, which is received in a pad of elastomeric material carried by the top face 44 of the underbody structure element 12.

The entire technical front panel 14 and underbody structure element 12 assembly may be brought in under the vehicle 10 when being mounted on the assembly line by a truck 46 which carries other parts of the vehicle, for example an engine 48.

As illustrated in FIG. 2, the method comprises a second step during which the technical front panel 14 is pivoted forward about the connecting means 40 of transverse axis. This configuration makes it possible to prevent parts of the technical front panel 14 that may have a transverse size greater than the transverse size of the teardrop mounts 24 from coming into contact with these mounts when the assembly consisting of the technical front panel 14 and of the underbody structure element 12 is raised up later.

Next, during a third step which has been depicted in FIG. 3, the underbody structure element 12 and the technical front panel 14 in the tilted position are moved upward in the direction "V" as far as the vehicle 10, so that the top face 44 of the element 12 comes into contact with the bottom end of the teardrop mounts 26.

During a fourth step which has been depicted in FIG. 4, the technical front panel 14 is pivoted in such a way in the "L" direction and about the "T" direction, in such a way that at least a first means 50 carried by an upper edge 52 of the technical front panel 14 encounters a complementary second means 54 carried by at least one of the transversely opposed parts 22 of the body shell structure element.

More specifically, as illustrated by FIGS. 6 to 8, the top edge 52 of the cross member 38 of the technical front panel comprises, at each of its ends 56, the first means 50 of which a guide element 58 or "throat" comprising at least one surface that is inclined upward from rear to front which is intended to ride up onto an associated corresponding flat surface 54 that forms the second means carried by each of the opposed parts 22 of the body shell structure element.

Advantageously, as illustrated by FIGS. 6 to 8, the first means 50 of the top edge 52 of the cross member 38 of the technical front panel 14 comprises, forward of the guide element 58, a flat surface 60 intended to rest on the associated corresponding flat surface 54 carried by each of the parts of the body shell structure element 22.

Specifically, during a fifth step, the technical front panel 14 is pushed rearward on the motor vehicle 10 so that the first means 50 rides up onto the second means 54, the technical front panel 14 lifting up from the transverse underbody structure element. This configuration allows the technical front panel 14 to come to rest against the opposed parts 22 of the body shell structure element while at the same time leaving its support on the underbody structure element 12. During this step, the guide element 58 crosses the associated flat surface 54 of the corresponding part of the part 22 of the body shell structure element, then the flat surface 60 of the first means 50 which rests on said flat surface 54.

The invention is therefore particularly advantageous in this in that it allows the vertical position of the technical front panel 14 to be determined with respect to the parts 22 of the body shell structure element rather than with respect to the underbody structure element 12, thus allowing far more precise positioning of a bumper or fender attached to the technical front panel with respect to the body shell structure element 18.

Another particularly innovative feature of the method according to the invention is that it also allows the technical front panel 14 to be positioned transversely.

As illustrated by FIG. 7, during the fifth step, the forward movement of the technical front panel in the direction "L" also causes the forward movement of a longitudinal finger 62 which, carried by one of the sides of the top edge of the technical front panel 14.

Thus, as illustrated by FIG. 8, the method according to the invention may additionally comprise a sixth step during which the longitudinal finger is realigned with a complementary third means 64 carried by one of the opposed parts 22 of the body shell structure element, in order transversely to re-center the technical front panel 14.

The complementary means 64 is, for example, a reference element intended to collaborate with the finger 62 carried by the side of the top edge 52 of the cross member 38 of the technical front panel 14, particularly a drilling intended to accept the finger 62 or, as depicted here, a vertical flat surface 64 intended to have the finger 62 butt transversely against it.

Realignment is then performed by a transverse push performed on the technical front panel 14 in the direction "T", which panel can then be definitively immobilized by any known means of the prior art, particularly using screws or bolts.

The invention therefore allows precise positioning, both vertically and transversely, of a technical front panel 14 on a motor vehicle body shell structure element 18.

The invention claimed is:

1. A method for mounting, on a motor vehicle, at least one transverse underbody structure element and a technical front panel to be mounted at a longitudinal end of a body shell structure element including two transversely opposed rails and two transversely opposed parts of the body shell structure element, comprising:
    positioning the technical front panel on a transverse underbody structure element via a connecting mechanism that allows the technical front panel to pivot about an axis that is transverse relative to the body shell structure and allows the technical front panel vertical movement relative to the body shell structure;
    pivoting the technical front panel forward about the transverse axis of the connecting mechanism;
    moving the transverse underbody structure element and the technical front panel in the tilted position upward as far as the vehicle;
    pivoting the technical front panel such that at least a first mechanism carried by an upper edge of the technical front panel encounters a complementary second mechanism carried by at least one of the transversely opposed parts of the body shell structure element;
    pushing the technical front panel rearward on the motor vehicle so that the first mechanism rides up onto the second mechanism, the technical front panel lifting up vertically relative to the body shell structure from the transverse underbody structure element.

2. The mounting method as claimed in claim 1, further comprising realigning a longitudinal finger carried by one of the sides of the top edge of the technical front panel with a complementary third mechanism carried by one of the opposed parts of the body shell structure element in order to transversely re-center the technical front panel relative to the body shell structure.

* * * * *